Dec. 22, 1964 V. J. GALATI ETAL 3,162,498

INCLINED CHASSIS MOUNTING FOR ELECTRONIC EQUIPMENT

Filed July 2, 1963 3 Sheets-Sheet 1

INVENTORS
VINCENT J. GALATI
AND EDWIN L. HERD
BY Wade Koontz
Lawrence S. Gallen
ATTORNEYS INVENTORS
VINCENT J. GALATI
AND EDWIN L. HERD
BY Wade Koontz
Lawrence S. Gatta
ATTORNEYS INVENTORS
VINCENT J. GALATI
AND EDWIN L. HERD
BY Wade Koontz
Lawrence S. Gittes
ATTORNEYS United States Patent Office 3,162,498
Patented Dec. 22, 1964

3,162,498
INCLINED CHASSIS MOUNTING FOR ELECTRONIC EQUIPMENT

Vincent J. Galati and Edwin L. Herd, Los Angeles, Calif., assignors to the United States of America as represented by the Secretary of the Air Force Filed July 2, 1963, Ser. No. 292,595
4 Claims. (Cl. 312—323)

This invention relates generally to chassis mountings, and more particularly to an inclined chassis mounting for electronic equipment or the like.

Electronic equipment employing visual indicators, for example, picture tubes or dials, may be mounted at an incline for ease of viewing. Naturally, the equipment will require the usual maintenance and servicing and thus, it is highly desirable that the equipment be readily accessible.

It is therefore, an object of this invention to mount a chassis for electronic equipment, or the like, at an incline.

It is an object of the invention to faciltate the maintenance and servicing of units mounted on inclined chassis.

Another object is to provide an inclined chassis mounting on slides for ready accessibility.

A further object is to provide an inclined chassis mounting which is economical to produce and which utilizes conventional, currently available components that lend themselves to standard mass production manufacturing techniques.

Other objects and a fuller understanding of the invention may be had by referring to the following description and claims, taken in conjunction with the accompanying drawings in which:

Figure 1:
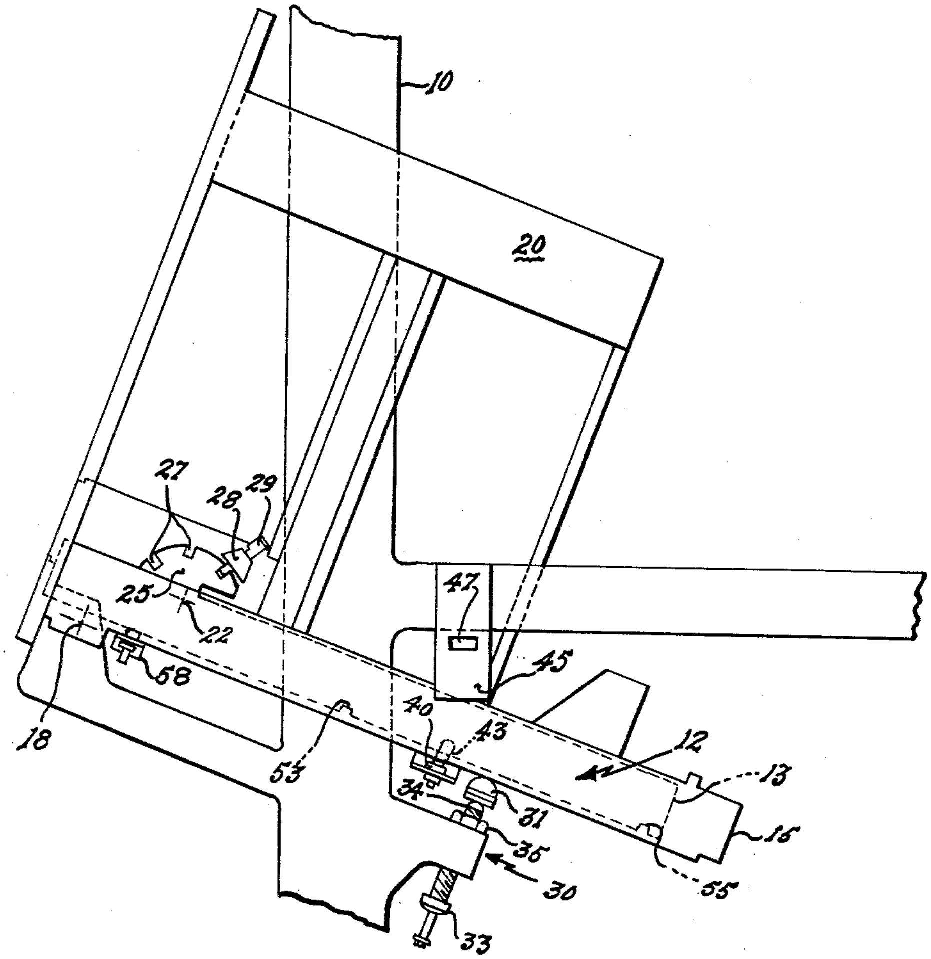
FIGURE 1 is a schematic side view showing a chassis at an inclined mount.

With reference to the drawings, a portion of a support structure 10 is illustrated. Normally, a sufficiently strong and sturdy support structure 10 may be provided by the framework of a cabinet used to house the equipment.

An extensible arm, indicated generally at 12, has a slide-extension member 13 telescoping within the length of a carriage-arm member 15. The extensible arm 12 is a commercially available slide with members fabricated of channeled lengths that provide adequate structural strength and a slideway track along its length. However, it is understood, of course, that the extensible arm of this invention is not necessarily limited to the aforementioned type of slides, but may be provided by other available means, for example, telescoping tubes. As illustrated, the carriage-arm 15 is hung at one end, to swing freely, on a horizontal pivot 18. A second and identical extensible arm, though not visible in the drawings, is pivoted in a like manner on structure 10 parallel to the arm arrangement shown. A sufficient space between the pair of extensible arms enables the chassis 20, a type common to electronic units, to be affixed therebetween. Chassis 20 is pivoted between the extensible arms on horizontal pivots in the slide-extension members, as shown by pivot 22 in slide-extension 13.

Figure 3:
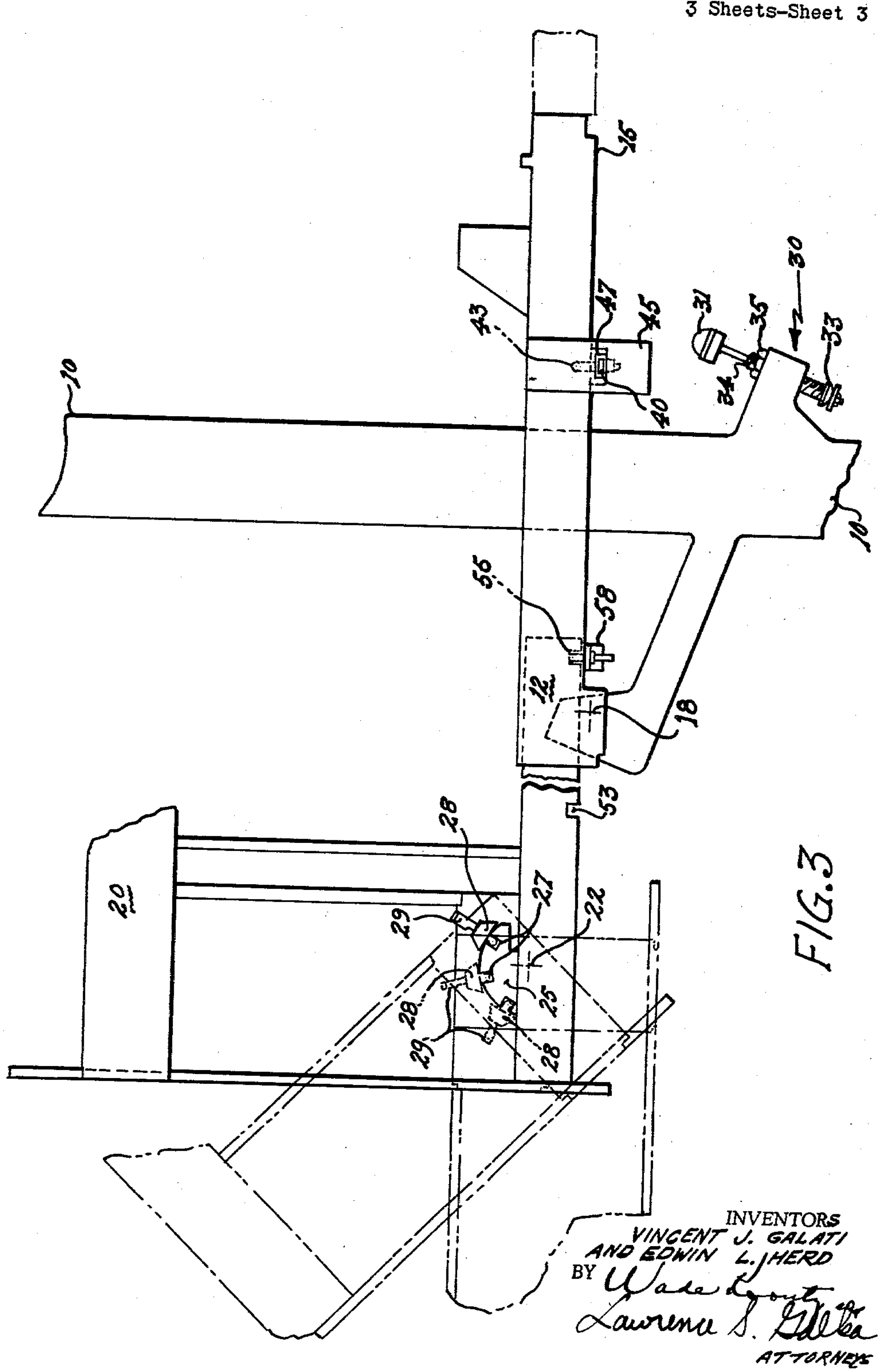
FIGURE 3 is a schematic side view showing the chassis at an accessible fully extended horizontal position.

An adjustable fastening means prevents the chassis 20 from freely turning on the slide-extensions by holding the chassis at a desired tilt posture with respect to the extension arm 12. As illustrated, the slide-extension 13 includes a semi-circular plate 25 with notches 27 spaced around the plate periphery. The chassis 20 includes a fastener bracket 28 with a removable pin 29 therethrough. FIGURE 3 illustrates various tilt postures accomplished by inserting pin 29 through bracket 28 and into the proper notch 27. Normally, the chassis 20 is at an inclined mount and has a perpendicular tilt posture with respect to extensible arm 12, as indicated in FIGURE 1.

A first stop means at 30 has been positioned on the structure 10, as shown, to block a downward swing of arm 12 at a desired incline. The chassis 20 is eased into its inclined mount by the resilient bumper 31 and the conventional shock absorber 33. The angle of incline may be adjusted, as desired, by turning the threaded bumper rod 34 and the lock-nut 35.

Figures 2, 4:
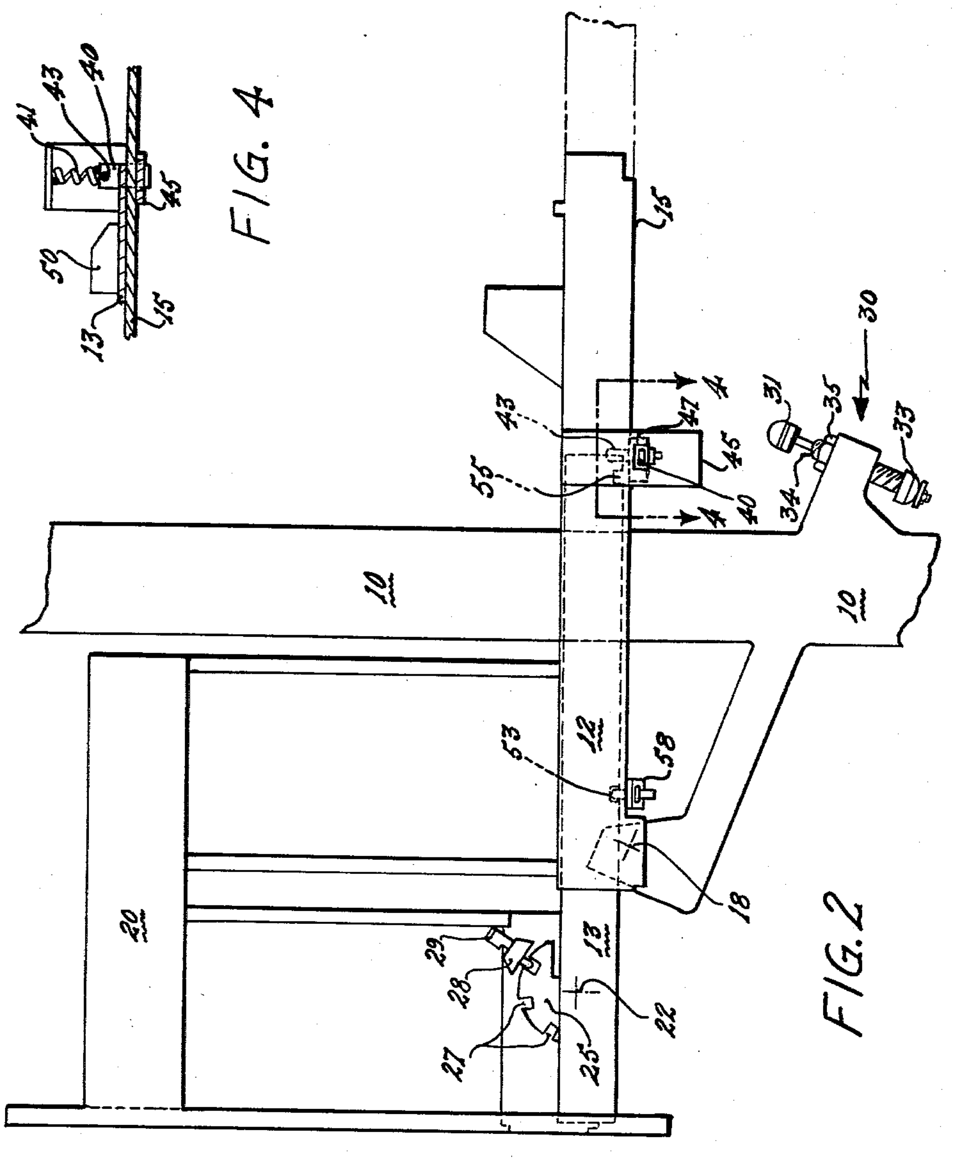
FIGURE 2 is a schematic side view showing the chassis at an intermediate horizontal position.
FIGURE 4 is a top view of a portion of FIGURE 2 showing the detail of a latch.

A second stop means has been provided by the retractable latch 40 together with the keeper bracket 45 affixed, respectively, on carriage arm 15 and structure 10. Upon an upward swing of arm 15, the latch 40 is biased by spring 41 into the opening 47 in keeper 45 and thereby locks arm 12 in a horizontal position, as illustrated in FIGURES 2 and 3. A retracting cam 50 (FIGURE 4) extends from slide-extension 13 for engagement with latch follower 43 upon contraction of arm 12. In this manner the latch 40 may be retracted and disengaged.

The limit notches 53 and 55 in slide-extension 13 are engaged by a detent 58 in carriage arm 15 for the purpose of locking arm 12 at the various extended lengths shown in FIGURES 2 and 3.

The ready accessibility of the invented mounting is easily demonstrated. Normally, chassis 20 is at the inclined mount of FIGURE 1 with the extensible arm 12 contracted by telescoping slide extension member 13 within carriage arm member 15. Since weight is concentrated at one side of pivot 18, the contracted arm 12 swings downward to rest on stop 30, thereby holding chassis 20 at an inclined mount. When access is desired, the chassis 20 may be pulled up the incline toward the left in the figures to extend arm 12 beyond pivot 18 until limit notch 53 is engaged. The preponderance of weight, now beyond pivot 18, will cause the carriage arm 15 to swing upward to a horizontal position, where it is locked by latch 40. By disengaging detent 58 and notch 53, the chassis 20 may be pulled outward further to limit notch 55. At this fully extended position the chassis 20 may be turned to a new tilt posture, if so desired. After performance of the necessary servicing and maintenance the chassis 20 is easily returned to its inclined mount.

Although the invention has been described with reference to a particular embodiment, it will be understood to those skilled in the art that the invention is capable of a variety of alternative embodiments within the spirit and scope of the appended claims.

We claim:

1. A readily accessible inclined chassis mounting, comprising: a cabinet structure; a pair of extensible arms carrying a chassis pivoted therebetween, said arms hung on horizontal pivots in said structure to swing upward upon extension beyond said pivots and downward upon contraction towards said structure; adjustable fastening means on said arms and chassis to affix a desired tilt posture therebetween; a stop means on said structure for blocking a downward swing of said arms at a contracted, inclined position and holding said chassis at an inclined mount; and latch means between said structure and arms for engagement upon an upward swing of said arms to lock said arms at a horizontal extended position accessible to said chassis.

2. A readily accessible inclined chassis mounting, comprising: a cabinet structure; a pair of extensible arms carrying a chassis pivoted therebetween, said arms having ends hung on horizontal pivots in said structure to swing upward upon extension beyond said ends and downward upon contraction towards said structure; detent means in said arms for locking said arms at various extended lengths; adjustable fastening means on said arms and chassis to affix a desired tilt posture therebetween; a stop means on said structure for blocking a downward swing of said arms at a contracted inclined position and holding said chassis at an inclined mount; and latch means between said structure and arms for engagement upon an upward swing of said arms to lock said arms at a horizontal extended position accessible to said chassis.

3. A readily accessible inclined chassis mounting, comprising: a cabinet structure; a pair of carriage arms with ends hung on horizontal pivots in said structure, said arms including slideways therealong; a pair of slide-extensions telescoping within said slideways and carrying a chassis pivoted therebetween, one of said extensions having notches therein; a detent in one of said arms biased for engagement with said notches to lock said extensions at various lengths; adjustable fastening means on said extensions and chassis to affix a desired tilt posture therebetween; a stop means on said structure for blocking a downward swing of said arms at an inclined position with said extensions telescoped therein to thereby hold said chassis at an inclined mount; and latch means between said structure and arms for engagement upon an upward swing of said arms to lock said arms with said slide-extensions extended at a horizontal position accessible to said chassis.

4. A readily accessible inclined chassis mounting, comprising: a cabinet structure; a pair of carriage arms with ends hung on horizontal pivots in said structure, said arms including slideways therealong; a pair of slide-extensions telescoping within said slideways and carrying a chassis pivoted therebetween, one of said extensions having notches therein and a retracting cam projecting therefrom; a detent in one of said arms biased for engagement with said notches to lock said extensions at various lengths; adjustable fastening means on said extensions and chassis to affix a desired tilt posture therebetween; a stop means on said structure for blocking a downward swing of said arms at an inclined position with said extensions telescoped therein to thereby hold said chassis at an inclined mount; a latch keeper in said structure; and a latch on one of said arms biased for engagement with said keeper upon an upward swing of said arms to lock said arms with said slide extensions extended at a horizontal position accessible to said chassis, said latch disengaged by said retracting cam upon telescoping of said extensions.

References Cited in the file of this patent

UNITED STATES PATENTS

| | | |
|---|---|---|
| 803,070 | Schmidt | Oct. 31, 1905 |
| 1,702,361 | Olinger | Feb. 19, 1929 |
| 1,816,213 | Duke | July 28, 1931 |
| 2,005,938 | Graves | June 25, 1935 |
| 2,566,064 | Keim | Aug. 28, 1951 |
| 2,788,253 | Gussack | April 9, 1957 |

FRANK B. SHERRY, *Primary Examiner.*

CHANCELLOR E. HARRIS, *Examiner.*